(12) United States Patent
Li et al.

(10) Patent No.: US 10,135,888 B2
(45) Date of Patent: Nov. 20, 2018

(54) INFORMATION PROCESSING METHOD AND DEVICE

(71) Applicants: Beijing Lenovo Software Ltd., Beijing (CN); Lenovo (Beijing) Co., Ltd., Beijing (CN)

(72) Inventors: Fanzhi Li, Beijing (CN); Mingxu Mao, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 625 days.

(21) Appl. No.: 14/498,094

(22) Filed: Sep. 26, 2014

(65) Prior Publication Data
US 2015/0248616 A1   Sep. 3, 2015

(30) Foreign Application Priority Data
Mar. 3, 2014   (CN) .......................... 2014 1 0074610

(51) Int. Cl.
| | | |
|---|---|---|
| *G06F 17/00* | (2006.01) | |
| *H04L 29/06* | (2006.01) | |
| *G06Q 10/10* | (2012.01) | |
| *H04W 4/21* | (2018.01) | |
| *G06Q 50/00* | (2012.01) | |

(52) U.S. Cl.
CPC ........... *H04L 65/403* (2013.01); *G06Q 10/10* (2013.01); *H04W 4/21* (2018.02); *G06Q 50/01* (2013.01)

(58) Field of Classification Search
CPC ............................ G06Q 50/01; G06K 9/00221
USPC ...................................................... 706/12, 45
See application file for complete search history.

(56) References Cited

U.S. PATENT DOCUMENTS 9,122,910 B2   9/2015   Cha
2013/0251201 A1   9/2013   Zhou
(Continued)

FOREIGN PATENT DOCUMENTS

| CN | 102355534 A | 2/2012 |
|---|---|---|
| CN | 102637183 A | 8/2012 |
| CN | 104102656 A | 10/2014 |

OTHER PUBLICATIONS

First Chinese Office Action regarding Application No. 201410074610.6 dated Nov. 28, 2017. English translation provided by http://globaldossier.uspto.gov.

*Primary Examiner* — David R Vincent
(74) *Attorney, Agent, or Firm* — Harness, Dickey & Pierce, P.L.C.

(57) ABSTRACT

An information processing method and device thereof are provided according to the embodiments of the disclosure. The information processing method acquires a first file and a second file having a first association relation therebetween, acquires a first object and a second object in the first file, acquires a third object and a fourth object in the second file, and establishes a association relation between the second object and the fourth object in the case that the first object and the third object meet a first preset condition. In the disclosure, the second association relation between the second object in the first file and the fourth object in the second file is established by determining the first file and the second file having the first association relation and by means of the relation between the first object in the first file and the third object in the second file.

6 Claims, 5 Drawing Sheets

(56) References Cited

U.S. PATENT DOCUMENTS

2014/0201126 A1* 7/2014 Zadeh .................... G06N 7/005
706/52
2014/0301612 A1* 10/2014 Cha .................... G06K 9/00677
382/118
2016/0261648 A1* 9/2016 Ruetschi ............... G06F 17/275

* cited by examiner

INFORMATION PROCESSING METHOD AND DEVICE

This application claims priority to Chinese patent application No. 201410074610.6 titled "INFORMATION PROCESSING METHOD AND DEVICE" and filed with the State Intellectual Property Office on Mar. 3, 2014, which is incorporated herein by reference in its entirety.

BACKGROUND

Technical Field

The disclosure relates to the field of information technology, and in particular to an information processing method and device.

Related Art

Social contact network, namely, social network service, is mainly for establishing an online community for people with the same interests and activities. Such service is based on the internet, and provides a user with various interaction pathways for contact and communication, such as an email, real-time message service. Nowadays, Facebook, renren.com and the like, which are popular at home and abroad, are typical social contact network service websites.

At present, there are many ways used by the social contact network to recommend other registered users as friends to a certain registered user. But these ways are still needed to improve their recommendation accuracy.

SUMMARY

The present disclosure is to provide an information processing method and device, so as to improve the probability for recommending friends among different people.

An information processing method is provided, which includes: acquiring a first association between a first file and a second file; acquiring information of a first object and information of a second object in the first file; acquiring information of a third object and information of a fourth object in the second file; judging whether the information of the first object and the information of the third object meet a first preset condition; and establishing a second association relation between the second object and the fourth object, in the case that the information of the first object and the information of the third object meet the first preset condition.

An information processing device is provided, which includes:

a file acquisition module configured to acquire a first association relation between the first file and the second file;

a first acquisition module configured to acquire information of a first object and information of a second object in the first file;

a second acquisition module configured to acquire information of a third object and information of a fourth object in the second file;

a judgment module configured to judge whether the information of the first object and the information of the third object meet a first preset condition; and a first establishment module configured to establish a second association relation between the second object and the fourth object, in the case that the information of the first object and the information of the third object meet the first preset condition.

BRIEF DESCRIPTION OF THE DRAWINGS

In order to illustrate the technical solutions according to the embodiments of the disclosure or in the conventional art more clearly, the accompanying drawings to be used in the description of the conventional art or the embodiments will be described briefly hereinafter. Apparently, the accompanying drawings described hereinafter are only some embodiments of the present disclosure, and other drawings may be obtained by those skilled in the art according to those accompanying drawings without creative effort.

The terms first, second, third, fourth and the like (if present) in the description and the claims and the above-mentioned accompanying drawings are used for distinguishing between similar elements, and are not necessarily used for describing a specific sequential or chronological order. It is to be understood that the terms so used are interchangeable under appropriate circumstances such that the embodiments of the disclosure described herein are capable of implementation in sequences other than those illustrated.

DETAILED DESCRIPTION OF THE EMBODIMENTS

Hereinafter, the technical solutions in the embodiments of the present disclosure will be described clearly and completely in conjunction with the accompanying drawings in the embodiments of the present disclosure. Apparently, the described embodiments are only a part of the embodiments of the present disclosure. All the other embodiments obtained by those skilled in the art based on the embodiments of the present disclosure without creative effort will fall within the scope of protection of the disclosure.

Figure 1:
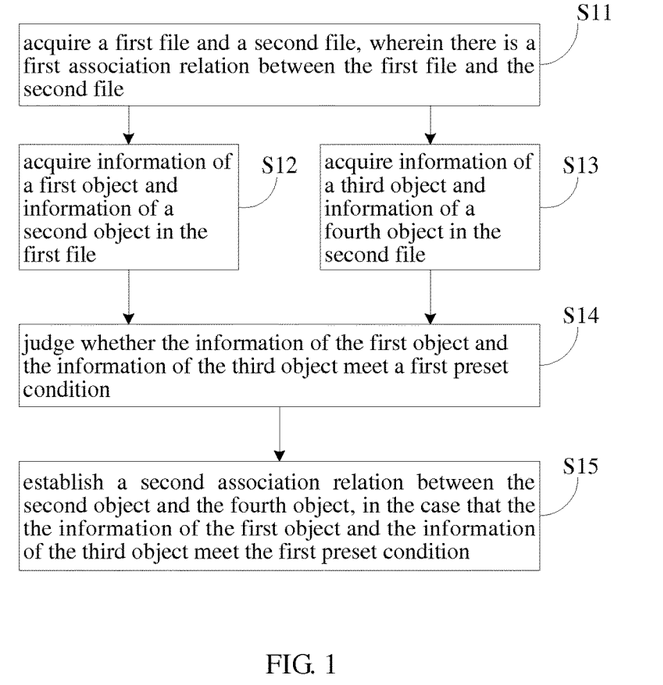
FIG. 1 is a flow chart of an information processing method according to an embodiment of the disclosure.

Referring to FIG. 1, FIG. 1 is a flow chart of an information processing method according to an embodiment of the disclosure, which may include steps S11 to S15.

In step S11, a first file and a second file are acquired, where there is a first association relation between the first file and the second file.

The first file may be a picture, a voice and the like. Accordingly, the second file may be a picture, a voice and the like.

There being a first association relation between the first file and the second file may mean that the first file and the second file are in the same computer, or are in the same folder in one computer.

There being a first association relation between the first file and the second file may also mean that the first file and the second file are in different computers in one local network.

There being a first association relation between the first file and the second file may also mean that the first file and the second file are in different computers within a preset geographical scope. For example, the preset geographical scope may mean a building or a community.

There being a first association relation between the first file and the second file may also mean that the first file and the second file are in the same network server. For example, the first file and the second file are in the same social contact network server.

In step S12, information of a first object and information of a second object in the first file are acquired.

In step S13, information of a third object and information of a fourth object in the second file is acquired.

For example, in the case that the information of the first file and the information of the second file both are pictures (such as photos), the information of the first object and the information of the second object in the first file may be a first human face feature and a second human face feature extracted from the first file, and the information of the third object and the information of the fourth object in the second file may be a third human face feature and a fourth human face feature extracted from the second file.

The sequential order of the step S12 and the step S13 are not defined specifically. The step S12 may be performed firstly and then the step S13 may be performed; alternatively, the step S13 may be performed firstly and then the step S12 may be performed; alternatively, the step S12 and the step S13 may be performed synchronously.

In step S14, it is judged whether the first object and the third object meet a first preset condition.

The information of the first object and the information of the third object may be compared for similarity. The relativity of the information of the first object and the information of the third object may be calculated. It is judged whether the similarity or relativity of the information of the first object and the information of the third object meets the preset condition.

For example, in the above-mentioned example, the first human face feature and the third human face feature may be compared, to judge whether the first human face feature and the third human face feature belong to the same person. In the case that the similarity of the first human face feature and the third human face feature meets the preset condition, it means that the first human face feature and the third human face feature belong to the same person.

In step S15, a second association relation between the second object and the fourth object is established, in the case that the information of the first object and the information of the third object meet the first preset condition.

In the above-mentioned example, assumed that the first human face feature corresponds to A, the second human face feature corresponds to B, the third human face feature corresponds to C and the fourth human face feature corresponds to D. Once it is determined that A and C are the same one by comparing the first human face feature and the third human face feature, the association relation between B and D may be established. For example, B and D may be recommended as a friend to each other.

The information processing method provided according to the disclosure, acquires a first association relation between a first file and a second file, acquires information of a first object and information of a second object in the first file, acquires information of a third object and information of a fourth object in the second file, and establishes a association relation between the second object and the fourth object in the case that the information of the first object and the information of the third object meet a first preset condition.

That is to say, in the disclosure, the second association relation between the second object in the first file and the fourth object in the second file is established by determining the first file and the second file between which there is the first association relation and by means of the relation between the information of the first object in the first file and the information of the third object in the second file, and therefore the probability for recommending friends among different people is improved. For example, the first file may include a first picture of two persons A and B, and the second file may include a second picture of two persons B and C. Once it is determined that the B in the first picture and the B in the second picture is the same one, A and C are recommended as a friend to each other. It is avoided that, A and C are not recommended as a friend to each other in the case that A and C both are registered in a certain social website but B which is the common friend of A and C is not registered in the social website. That is, by using the information processing method provided according to the disclosure, A and C can be recommended as a friend to each other even if B does not register in the social website, and therefore, the probability for A and C being recommended as a friend to each other is improved.

Figure 2:
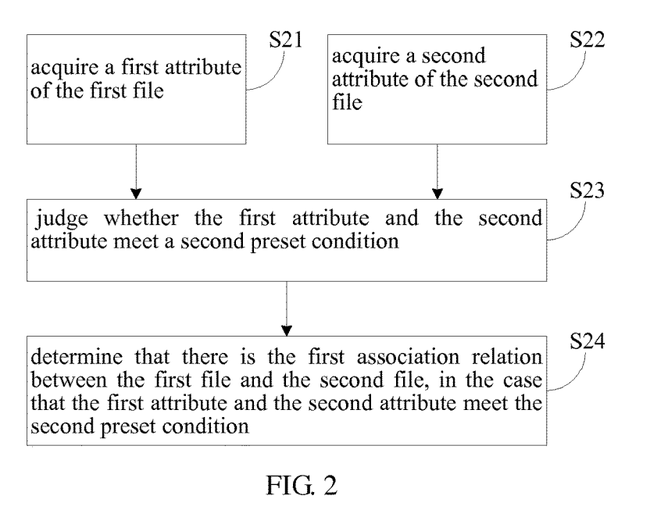
FIG. 2 is a flow chart for acquiring a first file and a second file according to an embodiment of the disclosure.

In the above described embodiment, preferably, the flow chart for acquiring a first file and a second file is shown in FIG. 2, which may include steps S21 to S24.

In step S21, a first attribute of the first file is acquired.

The first attribute of the first file may refer to an identification of a computer node for storing the first file or an identification of a network server node for storing the first file. The first attribute of the first file may also refer to a geographical location of the computer node for storing the first file. The first attribute of the first file may also refer to an identification of the local network in which the computer node for storing the first file is located.

In step S22, a second attribute of the second file is acquired.

The second attribute of the second file may refer to an identification of a computer node for storing the second file or an identification of a network server node for storing the second file. The second attribute of the second file may also refer to a geographical location of the computer node for storing the second file. The second attribute of the second file may also refer to an identification of the local network in which the computer node for storing the second file is located.

In step S23, it is judged whether the first attribute and the second attribute meet a second preset condition.

In step S24, it is determined that there is the first association relation between the first file and the second file, in the case that the first attribute and the second attribute meet the second preset condition.

In the embodiment of the disclosure, it may be determined that the first file and the second file are in the same computer, in the case that the identification of the computer node for storing the first file is the same as the identification of the computer node for storing the second file.

It may be determined that the first file and the second file are in different computers in one local network, in the case that the identification of the local network in which the first computer node for storing the first file is located is the same as the identification of the local network in which the second computer node for storing the second file is located.

It may be determined that the first file and the second file are in different computers within one preset geographical scope, in the case that the distance between the location of the first computer node for storing the first file and the location of the second computer node for storing the second file meets a preset distance condition.

It may be determined that the first file and the second file are in the same network server, in the case that the identification of the network server node for storing the first file is the same as the identification of the network server node for storing the second file.

Once it is determined that there is the first association relation between the first file and the second file, it may be determined that the first file and the second file are the first file and the second file which are to be acquired in the embodiment of the disclosure.

In the above described embodiment, preferably, the establishing a second association relation between a second object and a fourth object may include:

sending information of the fourth object to the second object, where the information of the fourth object is sent to the second object so that the second object acquires the information of the fourth object;

alternatively, sending information of the second object to the fourth object, where the information of the second object is sent to the fourth object so that the fourth object acquires the information of the second object;

alternatively, sending information of the fourth object to the second object and sending information of the second object to the fourth object.

After having received the information of the second object, the fourth object may select whether to establish a further association relation with the second object. Accordingly, after having received the information of the fourth object, the second object may select whether to establish a further association relation with the fourth object.

The above described embodiment, preferably, may further include:

sending the second file to the second object, so that the second object acquires the association relation between the third object (or the first object) and the fourth object;

alternatively, sending the first file to the fourth object, so that the fourth object gets the association relation between the first object (or the third object) and the second object;

alternatively, sending the second file to the second object and sending the first file to the fourth object.

Figure 3:
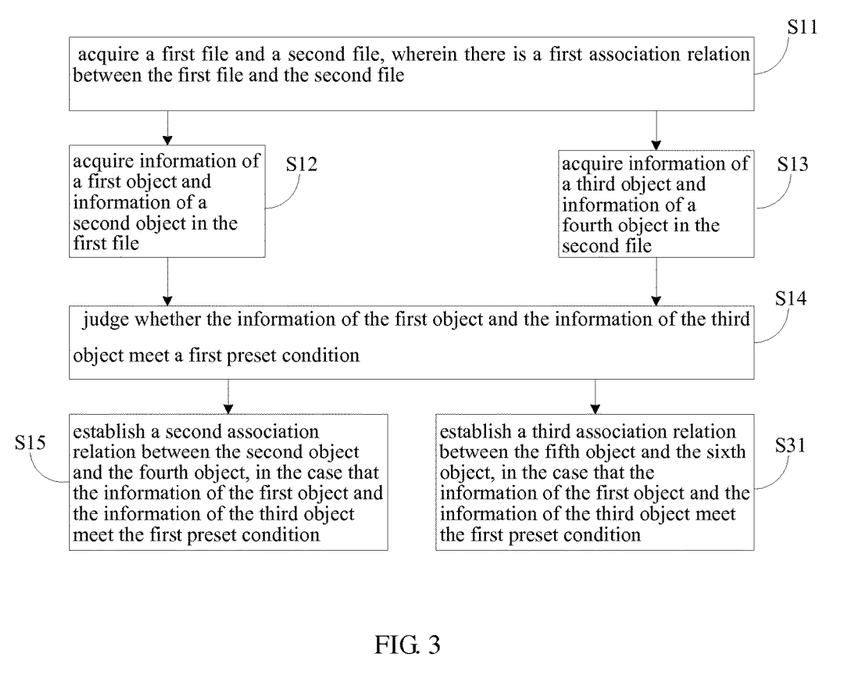
FIG. 3 is another flow chart of an information processing method according to an embodiment of the disclosure.

In the above described embodiment, preferably, in the case that the first file belongs to a fifth object and the second file belongs to a sixth object, another flow chart of an information processing method according to an embodiment of the disclosure is shown in FIG. 3. In the case that the first object and the third object meet the first preset condition, the information processing method may further include step S31.

In the step S31, a third association relation between the fifth object and the sixth object is established.

Specifically, the step S31 may include:

sending information of the sixth object to the fifth object, where the information of the sixth object is sent to the fifth object so that the fifth object acquires the information of the sixth object;

alternatively, sending information of the fifth object to the sixth object, where the information of the fifth object is sent to the sixth object so that the sixth object acquires the information of the fifth object;

alternatively, sending information of the sixth object to the fifth object and sending information of the fifth object to the sixth object.

After having received the information of the sixth object, the fifth object may select whether to establish a further association relation with the sixth object. Accordingly, after having received the information of the fifth object, the sixth object may select whether to establish a further association relation with the fifth object.

The above described embodiment, preferably, may further include:

sending the second file and the relation between the second file and the sixth object to the fifth object;

alternatively, sending the first file and the relation between the first file and the fifth object to the sixth object;

alternatively, sending the second file and the relation between the second file and the sixth object to the fifth object, and sending the first file and the relation between the first file and the fifth object to the sixth object.

In the embodiment of the disclosure, the first file and the second file may be a voice, in addition to a photo. In the case that the first file and the second file both are voice files, and the first file belongs to the fifth object and the second file belongs to the sixth object, the third association relation between the fifth object and the sixth object may be established in the case that the first file and the second file meet a preset voice matching condition.

Figure 4:
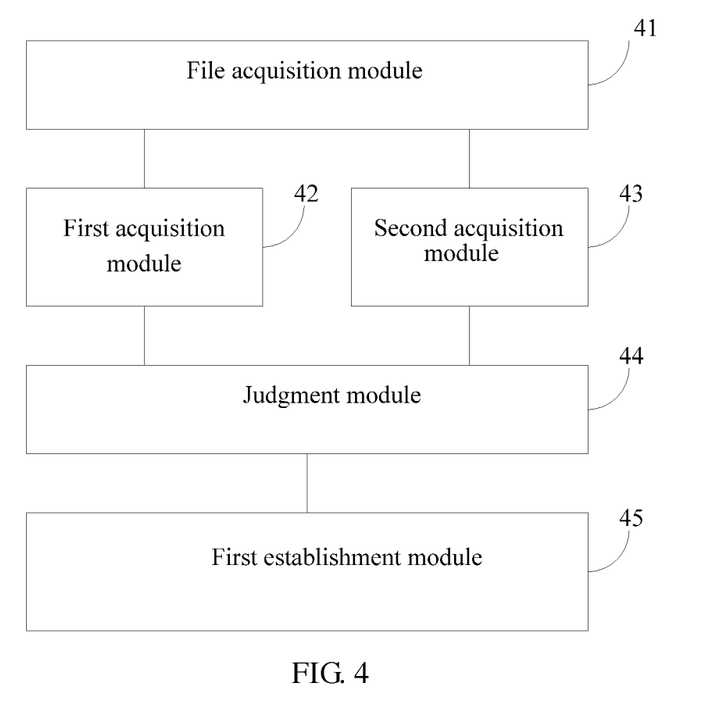
FIG. 4 is a schematic structural diagram of an information processing device according to an embodiment of the disclosure.

In correspondence with the embodiment of the method, it is further provided an information processing device according to an embodiment of the disclosure. A schematic structural diagram of the information processing device according to the embodiment of the disclosure is shown in FIG. 4, which may include: a file acquisition module 41, a first acquisition module 42, a second acquisition module 43, a judgment module 44 and a first establishment module 45.

The file acquisition module 41 is configured to acquire a first association relation between the first file and the second file.

There being a first association relation between the first file and the second file may mean that the first file and the second file are in the same computer, or are in the same folder in one computer.

There being a first association relation between the first file and the second file may also mean that the first file and the second file are in different computers in one local network.

There being a first association relation between the first file and the second file may also mean that the first file and the second file are in different computers within one preset geographical scope. For example, the preset geographical scope may mean a building or a community.

There being a first association relation between the first file and the second file may also mean that the first file and the second file are in the same network server. For example, the first file and the second file are in the same social contact network server.

The first acquisition module 42 is configured to acquire information of a first object and information of a second object in the first file.

The second acquisition module 43 is configured to acquire information of a third object and information of a fourth object in the second file.

The judgment module 44 is configured to judge whether the information of the first object and the information of the third object meet a first preset condition.

The information of first object and the information of the third object may be compared for similarity. Or the relativity of the information of the first object and the information of the third object may be calculated. It is judged whether the similarity or relativity of the information of the first object and the information of the third object meets the preset condition.

The first establishment module 45 is configured to establish a second association relation between the second object and the fourth object, in the case that the information of the first object and the information of the third object meet the first preset condition.

The information processing device provided according to the disclosure, acquires a first association relation between a first file and a second file, acquires information of a first object and information of a second object in the first file, acquires information of a third object and information of a fourth object in the second file, and establishes a association relation between the second object and the fourth object in the case that the information of the first object and the information of the third object meet a first preset condition.

That is to say, in the disclosure, the second association relation between the second object in the first file and the fourth object in the second file is established by determining the first file and the second file between which there is the first association relation and by means of the relation between the information of the first object in the first file and the information of the third object in the second file, and therefore the probability for recommending friends among different people is improved. For example, the first file may include a first picture of two persons A and B, and the second file may include a second picture of two persons B and C. Once it is determined that the B in the first picture and the B in the second picture is the same one, A and C are recommended as a friend to each other. It is avoided that, A and C are not recommended as a friend to each other in the case that A and C both are registered in a certain social website but B which is the common friend of A and C is not registered in the social website. That is, by using the information processing method provided according to the disclosure, A and C can be recommended as a friend to each other even if B does not register in the social website, and therefore, the probability for A and C being recommended as a friend to each other is improved.

Figure 5:
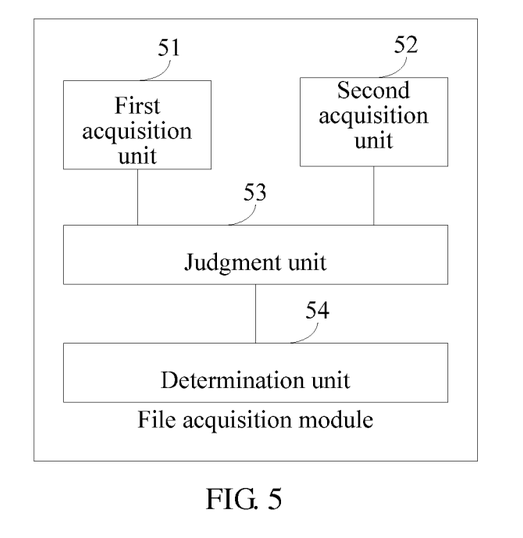
FIG. 5 is a schematic structural diagram of a file acquisition module according to an embodiment of the disclosure.

On the basis of the embodiment shown in FIG. 4, a schematic structural diagram of the file acquisition module 41 according to an embodiment of the disclosure is shown in FIG. 5, which may include: a first acquisition unit 51, a second acquisition unit 52, a judgment unit 53 and a determination unit 54.

The first acquisition unit 51 is configured to acquire a first attribute of the first file.

The first attribute of the first file may refer to an identification of a computer node for storing the first file or an identification of a network server node for storing the first file. The first attribute of the first file may also refer to a geographical location of the computer node for storing the first file. The first attribute of the first file may also refer to an identification of the local network in which the computer node for storing the first file is located.

The second acquisition unit 52 is configured to acquire a second attribute of the second file.

The second attribute of the second file may refer to an identification of a computer node for storing the second file or an identification of a network server node for storing the second file. The second attribute of the second file may also refer to a geographical location of the computer node for storing the second file. The second attribute of the second file may also refer to an identification of the local network in which the computer node for storing the second file is located.

The judgment unit 53 is configured to judge whether the first attribute and the second attribute meet a second preset condition.

The determination unit 54 is configured to determine that there is the first association relation between the first file and the second file, in the case that the first attribute and the second attribute meet the second preset condition.

In the embodiment of the disclosure, it may be determined that the first file and the second file are in the same computer, in the case that the identification of the computer node for storing the first file is the same as the identification of the computer node for storing the second file.

It may be determined that the first file and the second file are in different computers in one local network, in the case that the identification of the local network in which the first computer node for storing the first file is located is the same as the identification of the local network in which the second computer node for storing the second file is located.

It may be determined that the first file and the second file are in different computers within one preset geographical scope, in the case that the distance between the location of the first computer node for storing the first file and the location of the second computer node for storing the second file meets a preset distance condition.

It may be determined that the first file and the second file are in the same network server, in the case that the identification of the network server node for storing the first file is the same as the identification of the network server node for storing the second file.

Once it is determined that there is the first association relation between the first file and the second file, it may determined that the first file and the second file are the first file and the second file which are to be acquired in the embodiment of the disclosure.

Figure 6:
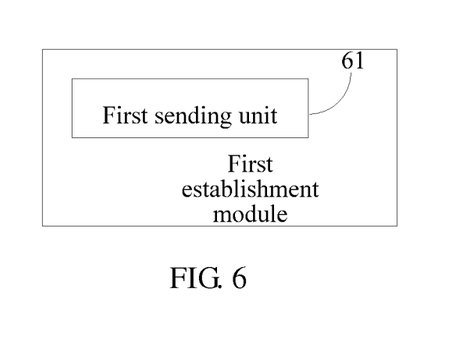
FIG. 6 is a schematic structural diagram of a first establishment module according to an embodiment of the disclosure.

On the basis of the embodiment shown in FIG. 4 or FIG. 5, a schematic structural diagram of the first establishment module 45 according to an embodiment of the disclosure is shown in FIG. 6, which may include:

a first sending unit 61 configured to send information of the fourth object to the second object, that is, the information of the fourth object is sent to the second object, so that the second object acquires the information of the fourth object.

Figure 7:
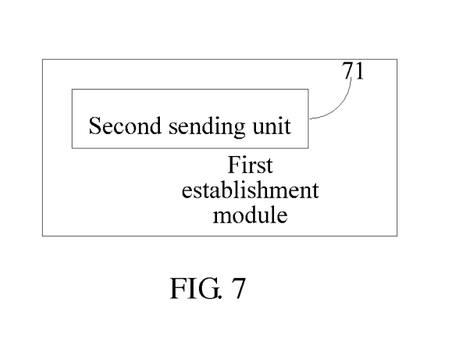
FIG. 7 is another schematic structural diagram of a first establishment module according to an embodiment of the disclosure.

On the basis of the embodiment shown in FIG. 4 or FIG. 5, another schematic structural diagram of the first establishment module 45 according to an embodiment of the disclosure is shown in FIG. 7, which may include:

a second sending unit 71 configured to send information of the second object to the fourth object, that is, the information of the second object is sent to the fourth object, so that the fourth object acquires the information of the second object.

Figure 8:
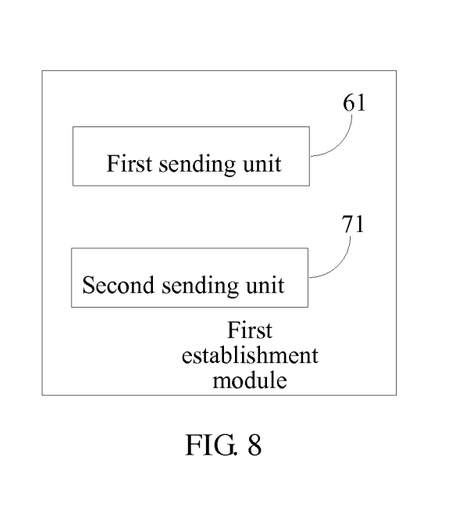
FIG. 8 is further another schematic structural diagram of a first establishment module according to an embodiment of the disclosure.

On the basis of the embodiment shown in FIG. 4 or FIG. 5, further another schematic structural diagram of the first establishment module 45 according to an embodiment of the disclosure is shown in FIG. 8, which may include:

the first sending unit 61 configured to send information of the fourth object to the second object, that is, the information of the fourth object is sent to the second object, so that the second object acquires the information of the fourth object; and the second sending unit 71 configured to send information of the second object to the fourth object, that is, the information of the second object is sent to the fourth object, so that the fourth object acquires the information of the second object.

In an embodiment of the disclosure, the first establishment module 45 may further include:

a third sending unit configured to send the second file to the second object, so that the second object acquires the association relation between the third object (or the first object) and the fourth object.

In another embodiment of the disclosure, the first establishment module 45 may further include:

a fourth sending unit configured to send the first file to the fourth object, so that the fourth object acquires the association relation between the first object (or the third object) and the second object.

In further another embodiment of the disclosure, the first establishment module 45 may further include:

the third sending unit configured to send the second file to the second object, so that the second object acquires the association relation between the third object (or the first object) and the fourth object; and the fourth sending unit configured to send the first file to the fourth object, so that the fourth object acquires the association relation between the first object (or the third object) and the second object.

Figure 9:
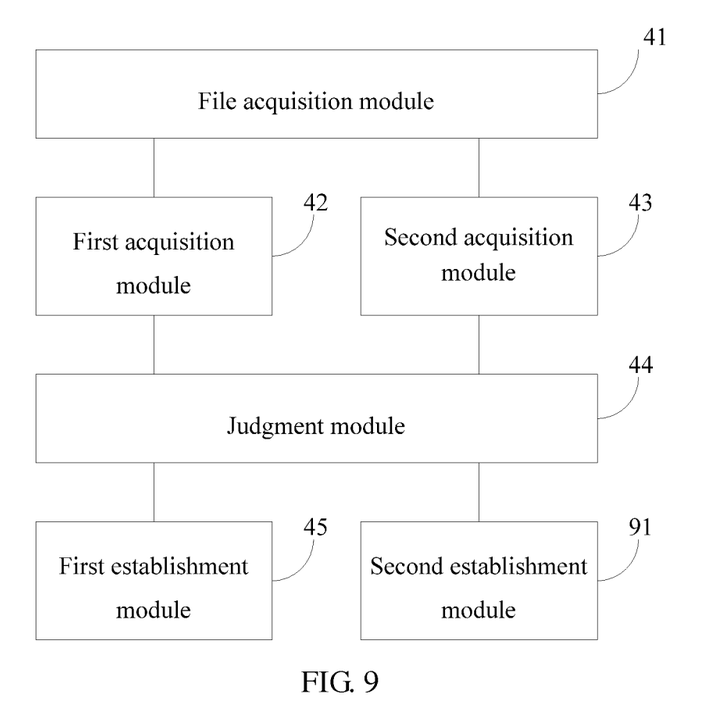
FIG. 9 is another schematic structural diagram of an information processing device according to an embodiment of the disclosure.

On the basis of the embodiment shown in FIG. 4, in the case that the first file belongs to the fifth object and the second file belongs to the sixth object, then another schematic structural diagram of an information processing device according to an embodiment of the disclosure is shown in FIG. 9, which may include:

a second establishment module 91 configured to establish a third association relation between the fifth object and the sixth object, in the case that the first object and the third object meet the first preset condition.

Specifically, the second establishment module 91 may include:

a fifth sending unit configured to send information of the sixth object to the fifth object, that is, the information of the sixth object is sent to the fifth object, so that the fifth object acquires the information of the sixth object; and/or a sixth sending unit configured to send information of the fifth object to the sixth object, that is, the information of the fifth object is sent to the sixth object, so that the sixth object acquires the information of the fifth object.

After having received the information of the sixth object, the fifth object may select whether to establish a further association relation with the sixth object. Similarly, after having received the information of the fifth object, the sixth object may select whether to establish a further association relation with the fifth object.

In the above described embodiment, preferably, the fifth sending unit may further send the second file and the relation between the second file and the sixth object to the fifth object; and the sixth sending unit may further send the first file and the relation between the first file and the fifth object to the sixth object.

Hereinafter, the information processing method provided according to the embodiments of the disclosure is illustrated with reference to particular applications.

For convenience of the description, in the following, it is taken as an example for illustration that both the first file and the second file are photos, where the first file is a first photo and the second file is a second photo.

When the photos are acquired, it is necessary for the acquired first photo and second photo to have a certain association relation between them. For example, the first photo and the second photo may be acquired from the same computer; alternatively, although the first photo and the second photo are acquired from different computers, the computer for storing the first photo and the computer for storing the second photo may be two computers located in the same local network, or the computer for storing the first photo and the computer for storing the second photo may be within a preset geographical scope; alternatively, the first photo and the second photo may be acquired from the same network server, such as one social contact network server.

In an application of the disclosure, there are pictures of two persons, respectively, the picture of A and the picture of B in the first photo, that is, the first photo is a group photo of A and B. There are pictures of two persons, respectively, the picture of C and the picture of D in the second photo, that is, the second photo is a group photo of C and D.

In the case that the first photo and the second photo meet any one of the above-mentioned association relations, the feature of A and the feature of B may be extracted from the first photo, and the feature of C and the feature of D may be extracted from the second photo. In the case that the feature of A and the feature of C meet the preset matching condition, it is determined that A and C is the same one. In this case, the association between B and D is established, the information of B may be sent to D, or the information of D may be sent to B. Specifically, the first photo may include the communication way corresponding to B and the information of B (such as, A and B are friends; the geographical location of B), and the second photo may include the communication way corresponding to D and the information of D (such as, C and D are friends; the geographical location of D). Therefore, the information of B may be sent to D, and/or the information of D may be sent to B, in the case that A and C meet the preset condition.

In the case that first photo and the second photo are located in the same network server, for example, the network server may be a social contact network server, such as the network server for renren.com. The first photo is the photo uploaded by the registered user B of renren.com, and the second photo is the photo uploaded by the registered user D of renren.com. In the case that the feature of A in the first photo and the feature of C in the second photo meet the preset matching condition, it may be determined that A and C is the same one. In this case, the association between B and D is established, the information of D may be sent to B by means of the user identification (such as, email address or phone number) of B, or the information of B may be sent to D by means of the user identification of D. That is, D is recommended as a friend to B, or B is recommended as a friend to D.

Meanwhile, the first photo may be sent to D, or the second photo may be sent to B, in order to inform each other that they have a common friend A (or C).

In another application of the disclosure, the first photo belongs to a user E, and the second photo belongs to a user F. In the case that the feature of A and the feature of C meet the preset matching condition, it is determined that A and C is the same one, which shows that E and F have a common friend A (or C). In this case, a third association relation between E and F may be established. In this application, there may be only A in the first photo, similarly, there may be only C in the first photo.

Specifically, the information of F may be sent to E, and/or the information of E may be sent to F. Thereby E and F may be recommended as a friend to each other.

E and F may be stored in different computers, or may be stored in the same network server.

Hereinafter, the embodiments of the disclosure are illustrated with reference to particular applications.

In an application of the disclosure, the user A has a personal computer, in which a first photo and a second photo are stored. The first photo includes two persons A and B, and the second photo includes two persons A and D. Once it is determined that the A in the first photo and the A in the second photo are the same one or the similarity of them meets a preset condition, it shows that B and D have a common friend A. Once it is determined that the first photo and the second photo come from the same computer, B and D may be recommended as a friend to each other.

In another application of the disclosure, a first photo is stored in a first computer, and a second photo is stored in a second computer. The first computer and the second computer belong to the same local network (for example, the first computer and the second computer may belong to the same Home Group, or a local network in a company). Assumed that, the user of the first computer is A and the user of the second computer is C. The first photo includes two persons A and B, and the second photo includes two persons C and D. In the case that it is determined that the first photo and the second photo come from different computers in one local network, once it is determined that A is the user of the first computer and C is the user of the second computer, B and D may be recommended as a friend to each other; once it is determined that A and C are the same one, B and D may also be recommended as a friend to each other.

In further another application of the disclosure, a first photo is stored in a first computer, and a second photo is stored in a second computer. The geographical locations of first computer and the second computer meet a preset geographical condition. For example, the first computer and the second computer are located in the same building, or in the same community. Assumed that, the user of the first computer is A and the user of the second computer is C. The first photo includes two persons A and B, and the second photo includes two persons C and D. In the case that it is determined that the first photo and the second photo come from different computers which meet the preset geographical condition, once it is determined that A is the user of the first computer and C is the user of the second computer, B and D may be recommended as a friend to each other.

In still another application of the disclosure, in the case that first photo and the second photo are stored in the same network server, such as a certain social contact network server. The first photo is the photo which is uploaded by the registered user B of a first social contact website to the network server, and the second photo is the photo which is uploaded by the registered user D of the first social contact website to the network server. Assuming that, there is at least A in the first photo and there is at least A in the second photo, once it is determined that the A in the first photo and the A in the second photo are the same one, B and D may be recommended as a friend to each other.

The above-mentioned solutions show that, the information processing method and the information processing device provided according to the disclosure acquire a first file and a second file having a first association relation therebetween, acquire a first object and a second object in the first file, acquire a third object and a fourth object in the second file, and establish a association relation between the second object and the fourth object in the case that the first object and the third object meet a first preset condition.

It should be noted that, in the above-mentioned embodiments, the embodiments of the disclosure are illustrated by taking the first object and the third object as persons in the photo. In the case that different persons have a common friend, the two different persons may be recommended as a friend to each other. However, in the embodiments of the disclosure, the first object and the third object are not limited only to person, but they may also be a scene or an animal. For example, for the people who like traveling, in the case that the first object and the second object are scenes, the persons with a common taste of traveling may be recommended as a friend to each other by embodiments of the present disclosure. Not only friends of a friend are recommended to each other, but also the persons with the same hobby are recommended as a friend to each other, and therefore the probability for recommending friends among different people is further improved.

The description of the embodiments herein enables those skilled in the art to implement or use the present disclosure. Numerous modifications to the embodiments will be apparent for those skilled in the art, and the general principle herein can be implemented in other embodiments without deviation from the spirit or scope of the present disclosure. Therefore, the present disclosure is not limited to the embodiments described herein, but in accordance with the widest scope consistent with the principle and novel features disclosed herein.

What is claimed is:

1. An information transmission method, comprising:
acquiring a first relation between a first file and a second file, wherein it is determined that there is the first relation between the first file and the second file when the first file and the second file are in one computer, in different computers in one local network, in different computers within a preset geographical scope, or in a same network server;
acquiring information of a first object and information of a second object in the first file;
acquiring information of a third object and information of a fourth object in the second file;
judging whether a similarity of the information of the first object and the information of the third object meet a first preset condition;
establishing a second relation between a user corresponding to the second object and a user corresponding to the fourth object when the similarity of the information of the first object and the information of the third object meet the first preset condition;
sending information of the fourth object to the user corresponding to the second object; and/or
sending information of the second object to the user corresponding to the fourth object,
wherein an object corresponds to a facial feature,
wherein the user corresponding to the second object and the user corresponding to the fourth object are registered with a social network service, and at least one of a user or users corresponding to the first object and the third object are not registered with the social network service with which the user corresponding to the second object and the user corresponding to the fourth object are registered,
wherein when the first file belongs to a user corresponding to a fifth object and the second file belongs to a user corresponding to a sixth object, the method further comprises:
establishing a third association relation between the user corresponding to the fifth object and the user corresponding to the sixth object when the information of the first object and the information of the third object meet the first preset condition, wherein, establishing the third association relation between the user corresponding to the fifth object and the user corresponding to the sixth object comprises at least one of:

sending information of the sixth object to the fifth object, where the information of the sixth object is sent to the fifth object so that the fifth object acquires the information of the sixth object; or sending information of the fifth object to the sixth object, where the information of the fifth object is sent to the sixth object so that the sixth object acquires the information of the fifth object.

2. The method according to claim 1, wherein acquiring a first relation between a first file and a second file comprises:
acquiring a first attribute of the first file;
acquiring a second attribute of the second file;
judging whether the first attribute and the second attribute meet a second preset condition; and
confirming the first relation between the first file and the second file when the first attribute and the second attribute meet the second preset condition.

3. The method according to claim 1, further comprising:
sending the second file to the user corresponding to the second object; and/or
sending the first file to the user corresponding to the fourth object.

4. An information transmission device, comprising:
a file acquisition module configured to acquire a first relation between a first file and a second file, wherein it is determined that there is the first relation between the first file and the second file, when the first file and the second file are in one computer, in different computers in one local network, in different computers within a preset geographical scope, or in a same network server;
a first acquisition module configured to acquire information of a first object and information of a second object in the first file;
a second acquisition module configured to acquire information of a third object and information of a fourth object in the second file;
a judgment module configured to judge whether a similarity of the information of the first object and the information of the third object meet a first preset condition;
a first establishment module configured to establish a second association relation between a user corresponding to the second object and a user corresponding to the fourth object when the similarity of the information of the first object and the information of the third object meet the first preset condition;

a first sending unit configured to send information of the fourth object to the user corresponding to the second object; and/or
a second sending unit configured to send information of the second object to the user corresponding to the fourth object,
wherein an object corresponds to a facial feature,
wherein the user corresponding to the second object and the user corresponding to fourth object are registered with a social network service, and at least one of a user or users corresponding to the first object and the third object are not registered with the social network service with which the user corresponding to the second object and the user corresponding to the fourth object are registered,
wherein when the first file belongs to a user corresponding to a fifth object and the second file belongs to a user corresponding to a sixth object, the device further comprises:
a second establishment module configured to establish a third association relation between the user corresponding to the fifth object and the user corresponding to the sixth object when the information of the first object and the information of the third object meet the first preset condition,
wherein, the second establishment module comprises:
a fifth sending unit configured to send information of the sixth object to the fifth object, that is, the information of the sixth object is sent to the fifth object, so that the fifth object acquires the information of the sixth object; and/or
a sixth sending unit configured to send information of the fifth object to the sixth object, that is, the information of the fifth object is sent to the sixth object, so that the sixth object acquires the information of the fifth object.

5. The device according to claim 4, wherein the file acquisition module comprises:
a first acquisition unit configured to acquire a first attribute of the first file;
a second acquisition unit configured to acquire a second attribute of the second file;
a judgment unit configured to judge whether the first attribute and the second attribute meet a second preset condition; and
a determination unit configured to determine that there is a first association relation between the first file and the second file when the first attribute and the second attribute meet the second preset condition.

6. The device according to claim 4, wherein the first establishment module further comprises:
a third sending unit configured to send the second file to the user corresponding to the second object; and/or
a fourth sending unit configured to send the first file to the user corresponding to the fourth object.

* * * * *